United States Patent [19]

Inukai et al.

[11] Patent Number: 5,081,165
[45] Date of Patent: Jan. 14, 1992

[54] ANTIFOULING COATING COMPOSITION CONTAINING FLUORINATED (METH)ACRYLATES

[75] Inventors: Hiroshi Inukai, Settsu; Takahiro Kitahara, Suita, both of Japan

[73] Assignee: Daikin Industries, Ltd., Osaka, Japan

[21] Appl. No.: 338,709

[22] Filed: Apr. 14, 1989

[30] Foreign Application Priority Data

Apr. 15, 1988 [JP] Japan .............................. 63-93860
Aug. 26, 1988 [JP] Japan ............................. 63-212741

[51] Int. Cl.⁵ ..................... C08F 2/46; C08F 18/20; C08F 218/02; C08F 220/22
[52] U.S. Cl. .................................. 522/182; 526/245; 526/247
[58] Field of Search ................. 522/182; 526/245, 247

[56] References Cited

U.S. PATENT DOCUMENTS

| | | | |
|---|---|---|---|
| 3,457,247 | 7/1969 | Katsushima et al. | 522/182 |
| 4,478,876 | 10/1984 | Chung | 522/182 |
| 4,673,621 | 6/1987 | Fujiki et al. | 526/245 |
| 4,786,658 | 11/1988 | Hashimoto et al. | 522/121 |
| 4,886,862 | 12/1989 | Kuwamura et al. | 526/247 |

FOREIGN PATENT DOCUMENTS 0336372 10/1989 European Pat. Off.
1411101 10/1975 United Kingdom.

OTHER PUBLICATIONS

Patent Abstracts of Japan, vol. 10, No. 107 (C-341) [2164], 22nd Apr. 1986.

Patent Abstracts of Japan, vol. 10, No. 139 (C-348) [2196], 22nd May 1986.

*Primary Examiner*—Marion E. McCamish
*Assistant Examiner*—Susan Berman
*Attorney, Agent, or Firm*—Larson and Taylor

[57] ABSTRACT

This provides an antifouling coating composition comprising a photopolymerization initiator or thermal polymerization initiator and a fluorine-containing (meth)acrylate represented by the formula (1)

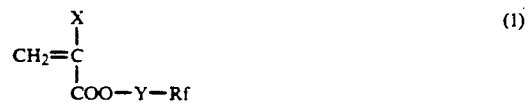

wherein X is hydrogen atom, fluorine atom, chlorine atom or methyl, Y is alkylene having 1 to 3 carbon atoms, a group —CH$_2$CH$_2$N(R)SO$_2$— (wherein R is alkyl having 1 to 4 carbon atoms), a group —CH$_2$CH(OZ)CH$_2$— (wherein Z is a hydrogen atom or acetyl) or a group

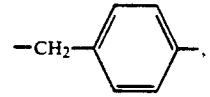

and Rf is fluoroalkyl having 6 to 15 carbon atoms or fluoroalkyl having 5 to 21 carbon atoms and containing 1 to 5 oxygen atoms in the carbon ring provided that the oxygen atoms are not present adjacent to one another.

4 Claims, No Drawings

ANTIFOULING COATING COMPOSITION CONTAINING FLUORINATED (METH)ACRYLATES

FIELD OF THE INVENTION

This invention relates to an antifouling composition capable of forming a coating layer excellent in weatherability and antifouling properties and articles partly or wholly coated with the composition.

BACKGROUND OF THE INVENTION

Known coating compositions having good weatherability include those containing a copolymer of fluoroolefin with vinyl ethers such as cyclohexylvinyl ether, alkylvinyl ether, hydroxyalkylvinyl ether and the like (e.g. Japanese Unexamined Patent Publication No.34107/1982).

However, these coating compositions have the drawbacks of having little antifouling properties and, when applied to the exterior wall boards or walls of houses, for example, the coated surfaces are prone to be stained with rain drops or trickles, metal rust, contaminants from exhaust fumes from automobiles, soils, etc., resulting in impaired appearance thereof. Further, when these compositions are applied to household electric appliances such as refrigerator, television set, microwave range, surfaces are easily stained with oil or grease, dirt from the hands, cigarette fume, marking pen, crayon, etc. which are difficult to remove.

It is also known that (meth)acrylate copolymers having long-chain fluoroalkyl group as side chain show excellent water- and oil-repellent and antifouling properties. Nevertheless, these copolymers have the drawbacks of being poor in weatherability and chemical resistance and easily degraded in oil repellency and antifouling property because the copolymers have a relatively low molecular weight of less than 10,000 and are not cross-linked.

SUMMARY OF THE INVENTION

An object of the invention is to provide a coating composition capable of forming a coat excellent both in weatherability and antifouling properties.

Another object of the invention is to provide an article having a coated layer excellent in weatherability and antifouling properties.

Other object and features of the invention will become apparent from the following description.

The present invention provides the following antifouling coating compositions.

(1) An antifouling coating composition (hereinafter referred to as "composition A") comprising a photopolymerization initiator or thermal polymerization initiator and a fluorine-containing (meth)acrylate represented by the formula (1)

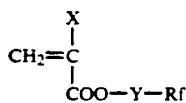

(1)

wherein X is hydrogen atom, fluorine atom, chlorine atom or methyl, Y is alkylene having 1 to 3 carbon atoms, a group —CH$_2$CH$_2$N(R)SO$_2$— (wherein R is alkyl having 1 to 4 carbon atoms), a group —CH$_2$CH(OZ)CH$_2$— (wherein Z is a hydrogen atom or acetyl) or a group

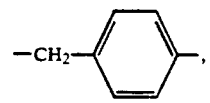

and Rf is fluoroalkyl having 6 to 15 carbon atoms or fluoroalkyl having 5 to 21 carbon atoms and containing 1 to 5 oxygen atoms in the carbon ring provided that the oxygen atoms are not present adjacent to one another.

(2) An antifouling coating composition (hereinafter referred to as "composition B") comprising a polymer containing a structural unit represented by the formula (2)

wherein X is hydrogen atom, fluorine atom, chlorine atom or methyl, Y is alkylene having 1 to 3 carbon atoms, a group —CH$_2$CH$_2$N(R)SO$_2$— (wherein R is alkyl having 1 to 4 carbon atoms), a group —CH$_2$CH(OZ)CH$_2$— (wherein Z is a hydrogen atom or acetyl) or a group

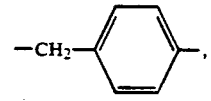

and Rf is fluoroalkyl having 6 to 15 carbon atoms or fluoroalkyl having 5 to 21 carbon atoms and containing 1 to 5 oxygen atoms in the carbon ring provided that the oxygen atoms are not present adjacent to one another.

The present invention further provides articles on the surface of which a cured coating film derived from the composition A or B is formed.

We have conducted intensive research in view of the foregoing problems of the prior art and consequently found that an antifouling composition comprising a specific (meth)acrylate or a polymer containing the (meth)acrylate unit gives a coating layer of highly improved weatherability and antifouling property and exhibits excellent processability enabling bending of the article which is formed of the coating film of the composition without causing cracking or peeling of the film, and the film formed has a high hardness. The present invention has been accomplished based on this novel finding.

DETAILED DESCRIPTION OF THE INVENTION

The composition A of the invention comprises a (meth)acrylate of the formula (1) as the component capable of forming antifouling coating films of highly improved properties (hereinafter referred to as "antifouling coating component").

With reference to the formula (1), examples of fluoroalkyl groups represented by Rf and having 6 to 12 carbon atoms or those represented by Rf and having 5 to 21 carbon atoms and containing 1 to 5 oxygen atoms in the carbon ring (provided that the oxygen atoms are not present adjacent to one another) are groups represented by the formula $$-(CF_2CF_2)_k CF(R^3)CF_3$$

wherein k is an integer of 1 to 6, and $R^3$ is a fluoride atom or trifluoromethyl, groups represented by the formula $$-[(CF_2)_lO]_p CF(R^3)CF_3$$

wherein $R^3$ is as defined above, l is an integer of 1 to 3, and p is an integer of 1 to 5, groups represented by the formula $$-\underset{CF_3}{CFO}(CF_2\underset{CF_3}{CFO})_q CF(R^3)CF^3$$

wherein $R^3$ is as defined above, and q is an integer of 0 to 4, and groups represented by the formula $$-Ph-O-Rf$$

wherein Ph is phenylene, and Rf is perfluoroalkylene having 5 to 15 carbon atoms.

More specific examples of fluorine-containing acrylates represented by the formula (1) are $$CH_2=CFCOOCH_2C_6F_{13}, CH_2=CFCOOCH_2CH_2C_8F_{15},$$

$$CH_2=CFCOOCH_2CH_2(CF_2)_6CF(CF_3)_2,$$

$$CH_2=CFCOOCH_2CH_2(CF_2CF_2)_nC_2F_5$$

(mixture of compounds wherein n is an integer of 3 to 6 ), $$CH_2=CFCOOCH_2CH_2N(CH_3SO_2C_8F_{17},$$

$$CH_2=CFCOOCH_2CH(OH)CH_2(CF_2)_6CF(CF_3)_2,$$

$$CH_2=CFCOOCH_2\underset{OCOCH_3}{CHCH_2C_8F_{17}},$$

$$CH_2=CFCOOCH_2\underset{CF_3}{CFOCF_2}\underset{CF_3}{CFOC_3F_7},$$

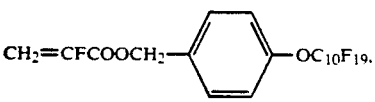

$$CH_2=(CH_3)COOCH_2CH_2C_8F_{17},$$

$$CH_2=(CH_3)COOCH_2CH_2(CF_2)_6CF(CF_3)_2$$

and the like.

Among the fluorine-containing (meth)acrylates (1), those wherein X is fluorine are more preferable.

When required, the composition A may contain hydrocarbon (meth)acrylates, (meth)acrylates having a functional group, etc. as antifouling coating components other than the fluorine-containing (meth)acrylates (1).

Examples of useful (meth)acrylates having functional group are compounds represented by the formula (3)

$$\underset{COO-A-B}{CH_2=\overset{X}{\underset{|}{C}}} \quad (3)$$

wherein X is as defined above, A is a group $-(CH_2)_a-$ (wherein a is 0 or an integer of 1 to 4), and B is a hydrogen atom, hydroxyl, epoxy, a group $-NHCH_2OH$, alkyl having 1 to 4 carbon atoms and having as substituent at least one of hydroxyl and halogen atoms or a group $$-Si(OR^1)_{3-b}\overset{(R^2)_b}{\underset{|}{}}$$

(wherein $R^1$ and $R^2$ are the same or different and represent a hydrogen atom or a alkyl having 1 to 4 carbon atoms, and b is 0 or an integer of 1 to 3.)

More specific examples of such (meth)acrylates (3) are $$CH_2=C(CH_3)COOCH_2\underset{O}{\overset{\diagdown\diagup}{CHCH_2}}, CH_2=CHCOOCH_2CH_2OH,$$

$$CH_2=CFCOO(CH_2)_3Si(OCH_3)_3, CH_2=C(CH_3)COOH,$$

$$CH_2=CHCOOCH_2\underset{OH}{CHCH_3}, CH_2=C(CH_3)COOCH_2\underset{HO}{\overset{|}{C}}H\underset{Cl}{\overset{|}{C}}H_2,$$

$$CH_2=CHCOONHCH_2OH$$

and the like.

Among the (meth)acrylates having a functional group and represented by the formula (3), those wherein B is a group $$-Si(OR^1)_{3-b}\overset{(R^2)_b}{\underset{|}{}}$$

(wherein $R^1$, $R^2$ and b are as defined above) are particularly preferred because those (meth)acrylates impart to the coating film particularly improved antifouling properties, weatherability, curing rate, transparency, smoothness, etc.

Examples of useful hydrocarbon (meth)acrylates are compounds represented by the formula (4)

$$\underset{COOZ}{CH_2=\overset{X}{\underset{|}{C}}} \quad (4)$$

wherein X is as defined above, and Z is alkyl having 1 to 10 carbon atoms, or alicyclic or aromatic group having 6 to 10 carbon atoms.

More specific examples of such (meth)acrylates (4) are $$CH_2=CFCOOCH_3, CH_2=C(CH_3)COOCH_3,$$

$$CH_2=C(CH_3)COOC_2H_5, CH_2=C(CH_3)COOC_4H_9,$$

$$CH_2=C(CH_3)COOCH_2\underset{CH_3}{CH_2CH_3},$$

-continued

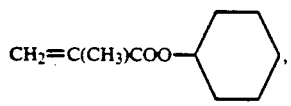

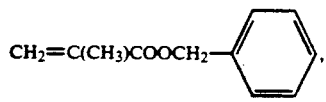

$CH_2=C(CH_3)COOCH_2C(CH_3)_3$, $CH_2=CHCOOCH_3$,

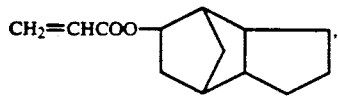

The composition A may contain ethylenically unsaturated monomers other than indicated above for reducing the cost of the composition. Examples of such monomers are ethylene, vinyl chloride, vinyl versate, stylene and the like.

In the case where the fluorine-containing (meth)acrylate (1), (meth)acrylate having a functional group (3) and hydrocarbon (meth)acrylate (4) are used in combination as antifouling coating components, the proportions of these compounds are not limited specifically but can be determined suitably. Usually it is desirable to use about 50 to about 99 wt. %, preferably about 60 to about 95 wt. %, of the fluorine-containing acrylate (1), about 1 to about 50 wt. %, preferably about 5 to about 40 wt. %, of the (meth)acrylate having a functional group (3), and up to 35 wt. %, preferably about 0.1 to about 20 wt. %, of the hydrocarbon (meth)acrylate (4). The ethylenically unsaturated monomers as defined above may be used in such an amount that the properties of the coating film are not impaired, usually up to 35 wt. % of the combined amount of all monomers.

The composition A contains, in addition to the antifouling coating component or components, a photopolymerization initiator or thermal polymerization initiator. Examples of useful photopolymerization initiators are those already known, such as benzoyl alkyl ethers, α-hydroxyisobutylphenone, 1-hydroxycyclohexyl phenyl ketone and the like. Examples of useful thermal polymerization initiators are also those already known, such as t-butyl peroxide, benzoyl peroxide and like peroxides, azobis(isobutyronitrile) and like azo compounds, etc. The amount of photopolymerization initiator or thermal polymerization initiator, although not limited specifically, is usually about 0.1 to about 10 parts by weight, preferably about 1 to about 5 parts by weight, per 100 parts by weight of the antifouling coating component.

An antifouling coating film can be formed on the desired article using the composition A in the same manner as usual coating compositions containing a photopolymerization initiator or thermal polymerization initiator, for example, by applying the composition A to the article and thereafter irradiating the coating with ultraviolet radiation or heating the coating to polymerize the (meth)acrylate compound present in the composition. The composition can be applied by any known method, for example, by brush coating, dipping, roll coating, spin coating, spray coating, flow coating, bar coating, screen printing, etc.

Photopolymerization is effected using ultraviolet radiation sources such as a high pressure mercury lamp, metal halide lamp and the like.

Thermal polymerization are carried out at room temperature or at elevated temperatures. When the polymerization is conducted with heating, the temperature is selected depending on the kind of initiator used and usually between about 50° to about 150° C.

The antifouling coating film to be formed is about 0.1 to about 150 μm in thickness.

Further, it is possible to crosslink the fluorine-containing polymer and accelerate the curing of the coating film by incorporating a known crosslinking agent and/or crosslink accelerator into the composition A. Examples of crosslinking agents are Lewis acid compounds, amino compounds, amide compounds, imino compounds, epoxy compounds, isocyanate compounds, carboxylic acid anhydride, etc. Examples of crosslinking accelerators are hydrochloric acid, acetic acid, p-toluenesulfonic acid, dibutyltin dilaurate, etc.

The composition A of the invention may further contain one or more of conventional additives such as pigment, dispersion stabilizer, viscosity regulating agent, leveling agent, anti-static agent, antigelling agent, UV absorber, antioxidant, flatting agent, filler, etc.

The antifouling component of the composition B is a fluorine-containing polymer containing structural units represented by the formula (2). More specifically, examples of useful fluorine-containing polymers are homopolymers or copolymers of fluorine-containing (meth)acrylates (1), copolymers of acrylates (1) and monomers copolymerizable therewith. Examples of useful monomers copolymerizable with acrylates (1) are (meth)acrylates having a functional group (3), hydrocarbon (meth)acrylates (4) and ethylenically unsaturated monomer other than monomers (1), (3) and (4) which are exemplified above. Use of the (meth)acrylate (3) as a monomer component enables the fluorine-containing copolymer obtained to exhibit improved hardness and adhesion to substrate. Further the (meth)acrylate (4), when used as a polymer component, permits the coating film formed to exhibit enhanced hardness.

The fluorine-containing polymer can be prepared by known radical polymerization processes, for example, by solution polymerization, bulk or mass polymerization, emulsion polymerization or suspension polymerization.

Examples of solvents usable for solution polymerization are m-xylenehexafluoride, trichlorotrifluoroethane and like fluorine-containing solvents, 1,1,1-trichloroethane and like chlorine-containing solvents, ethyl acetate and like ester solvents, methyl isobutyl ketone, acetone and like ketone solvents, toluene, xylene and like hydrocarbon solvents, etc. Useful polymerization initiators are those already known, such as azobisisobutyronitrile (AIBN) and like azo compounds, benzoyl peroxide and like peroxide compounds, etc. Further laurylmercaptan, thiophenol and the like may be used as chain transfer agents. The polymerization temperature, although not limited specifically, is usually about 30° to about 100° C.

The solution resulting from solution polymerization and containing the desired fluorine-containing polymer may be used as it is as the composition B. Alternatively, the fluorine-containing polymer may be separated from the solution and dried before use.

Bulk or mass polymerization, when to be resorted to, can be conducted using the same polymerization initiator, chain transfer agent and polymerization conditions as employed for solution polymerization. Preferably, the fluorine-containing polymer obtained by bulk or mass polymerization is separated from the resulting block and dried before use.

Known emulsifying agents are useful in the emulsion polymerization. Examples of emulsifying agents are fluorine-containing type such as ammonium salts of perfluorocarboxylic acids and the like, polyethyleneglycols, hydrocarbon type such as alkylphenylethers and the like. Known polymerization initiators can be used which include redox initiators consisting of oxidizing agents such as ammonium persulfate, potassium persulfate and the like, reducing agents such as sodium sulfate and the like and ferrous sulfate and like salts of transition metals; azo compounds such as azoisobutyroamidine hydrochloride etc.; peroxide compounds such as succinic acid peroxide, etc. Emulsion polymerization is conducted under the similar conditions as in solution polymerization.

Suspension polymerization can be conducted in the presence of suspension stabilizer such as sodium polyacrylate or the like using the same polymerization initiator and polymerization conditions as employed for emulsion polymerization.

When to be copolymerized, the fluorine-containing (meth)acrylate (1), (meth)acrylate having a functional group (3), hydrocarbon (meth)acrylate (4) and ethylenically unsaturated monomer other than monomer (1), (3) and (4) can be used in proportions which are not limited specifically. Usually, however, it is suitable to use about 50 to about 99 wt. %, preferably about 60 to about 95 wt. %, of the fluorine-containing acrylate (1), about 1 to about 50 wt. %, preferably about 5 to 40 wt. %, of the (meth)acrylate (3), and up to 35 wt. %, preferably about 0.1 to about 20 wt. %, of the hydrocarbon (meth)acrylate (4). The ethylenically unsaturated monomers as defined above may be used in such an amount that the properties of the coating film are not impaired, usually up to 35 wt. % of the combined amount of all monomer components.

Among the fluorine-containing polymers thus obtained, it is desirable to use those having a number average molecular weight of about 5,000 to about 4,000,000 (as determined by gel permeation chromatography) or those having an intrinsic viscosity [$\eta$] of about 0.15 to about 3.0 (solvent: m-xylenehexafluoride, methyl ethyl ketone, chloroform or 1,1,1-trichloroethane or the like, temperature: 35° C.). If the molecular weight is too small, the antifouling coating film is liable to separate from the article treated and is likely to have low strength, whereas if it is excessively great, the composition is not always applicable to articles easily.

The composition B can be prepared by dissolving the antifouling coating component, i.e. the fluorine-containing polymer, in a suitable solvent. Examples of useful solvents are m-xylenehexafluoride, trichlorotrifluoroethane and like fluorine-containing solvents, tetrachloroethylene, trichloroethylene, trichloroethane and like chlorine-containing solvents, acetone and like ketone solvents, ethyl acetate and like ester solvents, toluene and like aromatic solvents, n-hexane and like saturated aliphatic solvents, etc. The diluted composition can be applied by the same method as already described. After application, the composition is dried at room temperature or with heating at about 50° to about 150° C. for 30 minutes to 7 days, whereby an antifouling coating film is formed.

In the case where the monomer wherein the functional group is

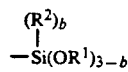

(wherein $R^1$, $R^2$ and b are as defined above) is used as a film forming component, it is preferable to admix curing accelerator, water and alcohol to the composition.

The concentration of the antifouling component, although not limited specifically, is suitably determined usually from the range of about 0.05 to about 40 wt. %, in view of work efficiency, etc. The antifouling coating film formed from the composition B may have the same thickness as is the case with the composition A. When the composition B is to be used, a crosslinking agent and/or crosslinking accelerator and additives mentioned above may be added to the composition B to further crosslink the fluorine-containing polymer and to thereby assure the coating of promoted curing.

Before the application of the composition of the invention, a primer coating may be formed on the surface of substrate or article to be protected in order to improve the adhesion of antifouling coating film to the surface. Any primer composition can be used which include those comprising silane coupling agent, acrylsilicone polymer, acrylate polymer, epoxy polymer, urethane polymer, etc.

The articles of the invention are partially or wholly coated with the composition A or B. The articles to be coated are not specifically limited and include those formed from a wide range of materials. Examples of the materials for articles are metals such as iron, aluminum, copper and alloys thereof; glass and enameled ware; resins such as ABS resin, AXS resin, polycarbonate resin, polyacrylate resin, polymethacrylate resin, amino resin, phenol resin, alkyd resin, polyvinyl chloride resin, polyester resin, polyurethane resin, polyamide resin, polyacetal resin, polyethylene resin, polypropylene resin, epoxy resin, furan resin, diallyl phthalate resin, polyvinyl acetate resin, polystylene resin, cellulosic plastics, etc.; natural and synthetic rubbers; wood, etc. Articles formed from these materials may be pretreated by plating, chemical conversion, oxidation and the like. Further, Articles may be formed of coating of resin as mentioned above.

Articles to be coated with the antifouling composition of the invention are not limited and include building, bridge, plant, sound-proof wall, tunnel, antennas and like outdoor constructions; refrigerator, television set, microwave oven, washer, dryer, electric ion, rice cooker, electric fan, air circulating fan, illuminating apparatus, air conditioner, stereo audio player and like household electric appliances; sink, cooking table, wagon and like kitchen ware; bathtub, bath burner, washbowl, toilet bowl and like sanitary ware; furniture, desk, interior wall board and the like; personal computer, word processor, copying machine, shredder, communication device, cabinet and like business machines; car, railroad car, ship, aircraft and like vehicles; inner surface of injection nozzle of ink-jet type printer, etc.

The antifouling coating compositions of the invention can produce coating films excellent in weatherability and antifouling property and having good processability. Thus, the article formed of the coating film of the composition of the invention can be bent without entailing cracks in the film or peeling of the film. Further, the coating film formed has a remarkable hardness.

For a better understanding of the invention, examples and comparative examples are given below.

EXAMPLE 1

A 75 g quantity of $CH_2=CFCOOCH_2CH_2C_8F_{17}$ (hereinafter referred to as "αF17F"), 25 g of $CH_2=CFCOO(CH_2)_3Si(OCH_3)_3$ and 3 g of Dalocure 1116 (photopolymerization initiator, product of Merck) were thoroughly mixed to obtain a composition of the invention.

The composition was applied with a doctor blade to a degreased aluminum sheet (BT712) to a thickness of 10 μm. The aluminum sheet was then irradiated with ultraviolet radiation to cure the coated composition. The antifouling coating film thus prepared was 9 μm in thickness.

The antifouling coating film was found to be resistant to m-xylene hexafluoride (mXHF), showing the film was fully crosslinked.

EXAMPLE 2

A 4-necked flask was charged with a mixture of 66 g of αF17F, 30 g of methylmethacrylate (MMA), 4 g of hydroxypropylacrylate (HPA), 0.5 g of azobisisobutyronitrile (AIBN) and 233 g of mXHF. After replacing the air in the flask with nitrogen, the mixture was reacted at 50° C. for 24 hours to obtain a 30 wt. % solution of fluorine-containing copolymer. To 30 g quantity of the solution were added 0.3 g of crosslinking agent (trademark "Melan 28", product of Hitachi Kasei Kabushiki Kaisha) and 0.1 g of p-toluenesulfonic acid (crosslinking accelerator). The intrinsic viscosity (η) of the copolymer after crosslinking determined at 35° C. using mXHF as solvent was 0.42.

The copolymer solution was diluted with 1,1,1-trichloroethane to a concentration of 20 wt. % to obtain a composition of the invention.

The composition thus produced was applied with a brush to a degreased aluminum sheet (BT712) and the aluminum sheet was heated at 140° C. for 60 minutes to cure the coated composition and to form a antifouling coating film 15 μm in thickness.

EXAMPLES 3 to 5

The compounds (1) to (7) shown below were polymerized in the same manner as in Example 2 to obtain fluorine-containing polymers each having the composition and intrinsic viscosity [η] listed in Table 1.

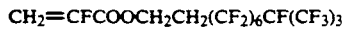

$CH_2=CFCOOCH_2CH_2(CF_2)_6CF(CF_3)_3$    (1)

(2)

(3)

$CH_2=CHCOOCH_2CH_2OH$    (4)

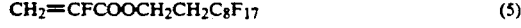

$CH_2=CFCOOCH_2CH_2C_8F_{17}$    (5)

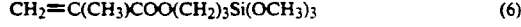

$CH_2=C(CH_3)COO(CH_2)_3Si(OCH_3)_3$    (6)

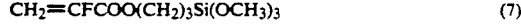

$CH_2=CFCOO(CH_2)_3Si(OCH_3)_3$    (7)

To each of the fluorine-containing polymer solution obtained were added curing agent and/or curing accelerator as required and the solution was applied to a degreased aluminum sheet (BT712). The coating layer on the sheet was cured under the conditions listed in Table 1 to form an antifouling coating film.

TABLE 1

| Ex. | Composition of copolymer (wt. ratio) | Intrinsic viscosity [η] | Crosslinking agent | Crosslinking accelerator | Condition | Film thickness (μm) |
|---|---|---|---|---|---|---|
| 3 | (1)/(2)/(6) 75/20/5 | 0.25 | — | Acetic acid[1], water:IPA[2] | 80° C. × 24 hr. | 28 |
| 4 | (5)/(7) 80/20 | 0.48 | — | Dibutyltin dilaurate[3], water:IPA[2] | 80° C. × 24 hr. | 21 |
| 5 | (1)/(3)/(4) 70/20/10 | 0.23 | Colonate EH[4] | Dibutyltin dilaurate[3] | room temp. × 7 days | 30 |

[1] 0.001 g per 1 g of polymer
[2] Water:IPA (isopropanol) = 1:1 ... 0.001 g per 1 g of polymer
[3] 0.0001 g per 1 g of polymer
[4] Product of Nippon Polyurethane Kabushiki Kaisha. 0.15 g

EXAMPLE 6

Using 75 g of $CH_2=C(CH_3)COOCH_2CH_2C_8H_{17}$ and 25 g of $CH_2=C(CH_3)COO(CH_2)_3Si(OCH_3)_3$, an antifouling coating film 9 μm in thickness was formed on an aluminum sheet in the same manner as in Example 1.

COMPARATIVE EXAMPLE 1

Using 70 g of $CH_2=CFCOOCH_2CH_2C_2F_5$ and 30 g of MMA and following the polymerization procedure of Example 2, a fluorine-containing copolymer having an intrinsic viscosity of 0.55 was obtained. An antifouling coating film (30 μm) was produced in the same manner as in Example 2.

COMPARATIVE EXAMPLE 2

A mixture of 50 g of an acrylic paint composition (trademark "Hitaloyd", product of Hitachi Kasei Kabushiki Kaisha) and 5.3 g of a crosslinking agent (trademark "Colonate EH", product of Nippon Polyurethane Kabushiki Kaisha) was diluted with a mixture of ethyl acetate/toluene (1/1) to a paint concentration of 30 wt. %.

The diluted paint composition was applied to a degreased aluminum sheet and cured at room temperature for 7 days to form an antifouling coating film 30 μm in thickness.

COMPARATIVE EXAMPLE 3

A mixture of 100 g of fluorine-containing weather resistant paint composition (trademark "Lumiflon", a product of Asahi Glass Co., Ltd.), 9.3 g of crosslinking agent (trademark "Colonate EH"), 3.5 mg of dibutyltin dilaurate and 100 g of xylene/methylisobutylketone (½) was applied to an aluminum sheet and cured at room temperature for 7 days to produce an antifouling coating film 30 μm in thickness.

EXAMPLE 7

The antifouling coating films obtained in Examples 1 to 5 and Comparative Examples 1 to 3 were tested for the following properties.

Results are given in Table 2.

I. Weatherability (1):

The coating film was subjected to weathering test for 2000 hours using "super long life sunshine carbon arc weather meter" (product of Suga Shikenki Kabushiki Kaisha) under the condition of wetting stage/drying stage=18 min./120 min. After the completion of the test, gloss retaining rate (%) of mirror kept at the angle of 60° was measured.

II. Weatherability (2):

Contact angles (°) with water of the coating film before and after the weatherability test (1) were measured, using CA-DS type contact angle tester (product of Kyowa Kagaku Kabushiki Kaisha).

III. Antifouling Property (1):

The aluminum sheet formed of antifouling coating film was bonded to the outer wall of a building of a plant at Settsu-shi, Osaka of Daikin Industries Ltd. After the lapse of one month, the aluminum sheet was washed with water and checked for gloss retaining rate according to the following criteria.

A ... Gloss retaining rate was over 90%.
B ... Gloss retaining rate was between 80% and 90%.
C ... Gloss retaining rate was between 60% and 70%.
D ... Glass retaining rate was less than 60%.

IV. Antifouling Property (2):

On the antifouling coating film formed on aluminum sheet were drawn ten red lines with an oil marker (product of Sakura Color Products, Co., Ltd.). The lines were erased with wiping cloth (trademark "Kim Wipe", product of Jujo Kimberley Co., Ltd.) attached to rubbing tester (product of Taihei Rika Kogyo Kabushiki Kaisha). The number of wiping strokes required for removing ten lines was determined.

Similar test specimen was set up on the roof of a factory at an angle of 45° and exposed to the atmosphere for 6 months. Wiping test for removing red lines was carried out in the same manner as above.

TABLE 2

|  | Weatherability | | Antifouling test[1] | Antifouling test[2] |
|---|---|---|---|---|
|  | Gloss retain- ing (%) | Contact angle (°) | | |
|  |  | Before test | After test | Gloss retaining rate (%) | Initial/ After 6 months |
| Ex. | | | | | |
| 1 | 98.5 | 115 | 106 | A | 6/6 |
| 2 | 98.0 | 116 | 108 | B | 30/30 |
| 3 | 97.0 | 118 | 110 | B | 20/25 |
| 4 | 98.2 | 115 | 105 | A | 6/6 |
| 5 | 97.5 | 116 | 108 | A | 18/20 |
| 6 | 58.2 | 115 | 100 | C | 8/80 |
| Comp. Ex. | | | | | |
| 1 | 81.6 | 105 | 100 | D | 100/200 |
| 2 | 60.7 | 83 | 70 | D | 100/200 |
| 3 | 97.9 | 84 | 82 | D | 400</400< |

EXAMPLE 8

The aluminum sheets on which the antifouling coating films were formed in Examples 1 to 5 and Comparative Example 1 to 3 were subjected to the following processability tests.

Results are given Table 3 below.

I. Bending test:

Bending test according to JIS K 5400 was carried out using a rod (2 mm in diameter) and a support plate (4 mm in thickness) to evaluate the quality of the antifouling coating film.

The criteria for evaluation are as follows.
A ... No defects found.
B ... Cracks found or small area peeled.
C ... Film peeled.

II. Impact test:

Impact test according to JIS K 5400 (Du pont Impact test) was carried out under the conditions; weight=500 g, falling distance=50 cm, radius of blow mold=6.35 mm, and the quality of the antifouling coating film was evaluated with the following criteria.

A ... No defects such as crack, peeling detected.
B ... Cracks and/or peeling of small area detected.
C ... Film peeled.

TABLE 3

|  | Bending Test | Impact Test |
|---|---|---|
| Ex. | | |
| 1 | A | A |
| 2 | A | A |
| 3 | A | A |
| 4 | A | A |
| 5 | B | B |
| Comp. Ex. | | |
| 1 | C | C |
| 2 | C | B |
| 3 | C | B |

Table 2 and 3 reveal that the compositions of the invention can produce coating films excellent in antifouling property, weatherability and processability.

EXAMPLE 9

A 75 g quantity of $CH_2=CFCOOCH_2CH_2C_8F_{17}$ and 75 g of $CH_2=CFCOO(CH_2)_3Si(OCH_3)_3$ were copolymerized in the similar manner as in Example 2 and the copolymer obtained was diluted with mXHF to produce a solution with a solid concentration of 5 wt. %. Dibutyltin dilaurate (curing accelerator) was added to the solution in an amount of 0.1 part per 100 parts of solid to prepare an antifouling coating composition.

The coating composition was applied with a brush to the surface of body (ABS resin) of an electric cleaner. The coated composition was dried at room temperature for 30 minutes and then heated at 80° C. for 12 hours to obtain a cured coating film 5 μm in thickness.

The electric cleaner body formed of the coating film was subjected to the tests listed in Table 4. Table 4 shows the results of an electric cleaner to which the coating composition was not applied.

TABLE 4

|  | Marking[1] Pen | Hand dirts | Cross[2] Cut | Pencil Hardness |
|---|---|---|---|---|
| Coated cleaner | Not stained | Not stained | 100/100 | H |
| Non-coated cleaner | Stained | Stained | — | HB |

[1]Red oil marker (product of Sakura Color Products Co., Ltd.)
[2]JIS K 5400

EXAMPLE 10

Following the procedure of Example 9, an antifouling coating film was formed on a sound proof board made of polycarbonate.

The board was fixed for one year to the wall along a road in Settsu-shi, Osaka and then subjected to the same tests as in Example 9. The results are given in Table 5.

TABLE 5

|  | Marking Pen | Cross Cut | Pencil Hardness |
|---|---|---|---|
| Coated board | Not stained | 100/100 | H |
| Non-coated board | Stained | — | HB |

EXAMPLE 11

Following the procedure of Example 9, the antifouling coating composition was applied to the aluminum fin element of air conditioner and cured.

The air conditioner was continuously operated for 10 days and frost formation on the fin element was checked.

The results are shown in Table 6 below.

TABLE 6

|  | Frost | Cross Cut | Marking Pen |
|---|---|---|---|
| Coated fin | Almost no formation | 100/100 | Not stained |
| Non-coated fin | Distinct formation | — | Stained |

We claim:

1. An antifouling coating composition consisting essentially of:

50 to 99 wt. % of a fluorine-containing acrylate represented by the formula (1)

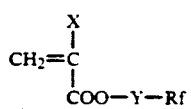

$$\text{CH}_2\text{=C} \overset{\text{X}}{\underset{\text{COO—Y—Rf}}{|}} \quad (1)$$

wherein X is a fluorine atom, Y is alkylene having 1 to 3 carbon atoms, a group —CH$_2$CH$_2$N(R)SO$_2$— (wherein R is alkyl having 1 to 4 carbon atoms), a group —CH$_2$CH(OZ)CH$_2$— (wherein Z is a hydrogen atom or acetyl) or a group

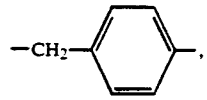

and Rf is fluoroalkyl having 6 to 15 carbon atoms or fluoroalkyl having 5 to 21 carbon atoms and containing 1 to 5 oxygen atoms in the carbon ring provided that the oxygen atoms are not present adjacent to one another, 50 to 1 wt. % of a (meth)acrylate represented by the formula (3)

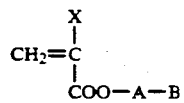

$$\text{CH}_2\text{=C} \overset{\text{X}}{\underset{\text{COO—A—B}}{|}} \quad (3)$$

wherein X is hydrogen atom, fluorine atom, chlorine atom or methyl, A is a group —(CH$_2$)$_a$— (wherein a is 0 or an integer of 1 to 4), and B is a group

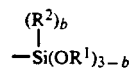

(wherein R$^1$ and R$^2$ are the same or different and represent a hydrogen atom or an alkyl having 1 to 4 carbon atoms and b is 0 or an integer of 1 to 3), and an effective amount of a photopolymerization initiator or thermal polymerization initiator.

2. An antifouling coating composition consisting essentially of 50 to 99 wt. % of a fluorine-containing acrylate represented by the formula (1).

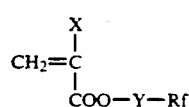

$$\text{CH}_2\text{=C} \overset{\text{X}}{\underset{\text{COO—Y—Rf}}{|}} \quad (1)$$

wherein X is a fluorine atoms, Y is alkylene having 1 to 3 carbon atoms, a group —CH$_2$CH$_2$N(R)SO$_2$— (wherein R is alkyl having 1 to 4 carbon atoms), a group —CH$_2$CH(OZ)CH$_2$— (wherein Z is a hydrogen atom or acetyl) or a group

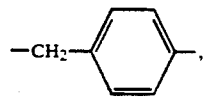

and Rf is fluoroalkyl having 6 to 15 carbon atoms or fluoroalkyl having 5 to 21 carbon atoms and containing 1 to 5 oxygen atoms in the carbon ring provided that the oxygen atoms are not present adjacent to one another, 50 to 1 wt. % of a acrylate represented by the formula (3-a)

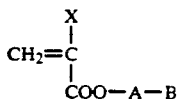
(3-a)

wherein X is fluorine atom, A is a group —(CH$_2$)$_a$— (wherein a is 0 or an integer of 1 to 4), and B is a group

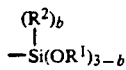

(wherein R$^1$ and R$^2$ are the same or different and represent a hydrogen atom or an alkyl having 1 to 4 carbon atoms and b is 0 or an integer of 1 to 3), and an effective amount of a photopolymerization initiator or thermal polymerization initiator.

3. An antifouling coating composition consisting essentially of a polymer which comprises:
50 to 90 wt. % of a unit represented by the formula (2)

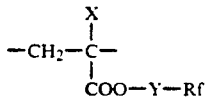
(2)

wherein X is a fluorine atom, Y is alkylene having 1 to 3 carbon atoms, a group —CH$_2$CH$_2$N(R)SO$_2$— (wherein R is alkyl having 1 to 4 carbon atoms), a group —CH$_2$CH(OZ)CH$_2$— (wherein Z is a hydrogen atom or acetyl) or a group

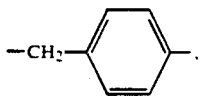

and Rf is fluoroalkyl having 6 to 15 carbon atoms or fluoralkyl having 5 to 21 carbon atoms and containing 1 to 5 oxygen atoms in the carbon ring provided that the oxygen atoms are not present adjacent to one another,
50 to 1 wt. % of a unit represented by the formula (3')

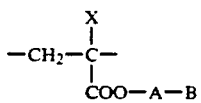
(3')

wherein X is hydrogen atom, fluorine atom, chlorine atom or methyl, A is a group —(CH$_2$)$_a$— (wherein a is 0 or an integer of 1 to 4), and B is a hydrogen atom, hydroxyl, epoxy, a group —NHCH$_2$OH, alkyl having 1 to 4 carbon atoms and having as substituent at least one of hydroxyl and halogen atoms or a group

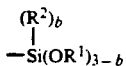

(wherein R$^1$ and R$^2$ are the same or different and represent a hydrogen atom or an alkyl having 1 to 4 carbon atoms and b is 0 or an integer of 1 to 3), and
an effective amount of a crosslinking agent and/or a crosslinking accelerator.

4. An antifouling coating composition consisting essentially of polymer which comprises:
60 to 95% wt. % of a unit represented by the formula (2)

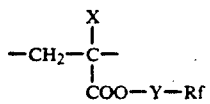
(2)

wherein X is a fluorine atom, Y is alkylene having 1 to 3 carbon atoms, a group —CH$_2$CH$_2$N(R)SO$_2$— (wherein R is alkyl having 1 to 4 carbon atoms), a group —CH$_2$CH(OZ)CH$_2$— (wherein Z is a hydrogen atom or acetyl) or a group

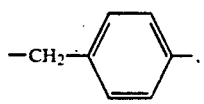

and Rf is fluoralkyl having 6 to 15 carbon atoms or fluoralkyl having 5 to 21 carbon atoms and containing 1 to 5 oxygen atoms in the carbon ring provided that the oxygen atoms are not present adjacent to one another,
5 to 40 wt. % of a unit represented by the formula (3')

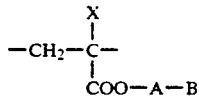
(3')

wherein X is hydrogen atom, fluorine atom, chlorine atom or methyl, A is a group —(CH$_2$)$_a$— (wherein a is 0 or an integer of 1 to 4), and B is a hydrogen atom, hydroxyl, epoxy, a group —NHCH$_2$OH, alkyl having 1 to 4 carbon atoms and having as substituent at least one of hydroxyl and halogen atoms or a group

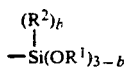

(wherein R$^1$ and R$^2$ are the same or different and represent a hydrogen atom or an alkyl having 1 to 4 carbon atoms and b is 0 or an integer of 1 to 3), and
up to 35 wt. % of a unit represented by the formula (4')

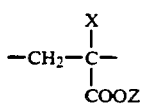
(4')

wherein X is hydrogen atom, fluorine atom, chlorine atom or methyl, and Z is alkyl having 1 to 10 carbon atoms, or alicyclic or aromatic group having 6 to 10 carbon atoms, and
an effective amount of a crosslinking agent and/or a crosslinking accelerator.

* * * * *